US011448560B2

(12) United States Patent
Aizawa et al.

(10) Patent No.: US 11,448,560 B2
(45) Date of Patent: Sep. 20, 2022

(54) STRAIN GAUGE AND SENSOR MODULE

(71) Applicant: MINEBEA MITSUMI Inc., Nagano (JP)

(72) Inventors: Yuta Aizawa, Shizuoka (JP); Atsushi Kitamura, Shizuoka (JP); Eiji Misaizu, Kanagawa (JP); Akiyo Yuguchi, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 228 days.

(21) Appl. No.: 16/956,795

(22) PCT Filed: Dec. 25, 2018

(86) PCT No.: PCT/JP2018/047513
§ 371 (c)(1),
(2) Date: Aug. 24, 2020

(87) PCT Pub. No.: WO2019/131605
PCT Pub. Date: Jul. 4, 2019

(65) Prior Publication Data
US 2020/0393311 A1 Dec. 17, 2020

(30) Foreign Application Priority Data

Dec. 28, 2017 (JP) .............................. JP2017-254442

(51) Int. Cl.
*G01L 1/00* (2006.01)
*G01L 1/22* (2006.01)
(52) U.S. Cl.
CPC ................. *G01L 1/2287* (2013.01)

(58) Field of Classification Search
CPC ..................................................... G01L 1/2287
See application file for complete search history.

(56) References Cited

U.S. PATENT DOCUMENTS

| 4,510,178 A * | 4/1985 | Paulson ................. H01C 17/12 427/101 |
| 5,369,875 A | 12/1994 | Utsunomiya et al. |
| 5,754,167 A | 5/1998 | Narusawa et al. |
| 5,914,168 A | 6/1999 | Wakamatsu et al. |

(Continued)

FOREIGN PATENT DOCUMENTS

| EP | 0725392 | 8/1996 |
| JP | S59-037528 U | 3/1984 |

(Continued)

OTHER PUBLICATIONS

International Search Report for PCT/JP2018/047513 dated Feb. 12, 2019.

(Continued)

*Primary Examiner* — Max H Noori
(74) *Attorney, Agent, or Firm* — IPUSA, PLLC

(57) ABSTRACT

A strain gauge includes a flexible substrate, and a plurality of resistors each formed of a Cr composite film, on or above the substrate. The substrate is attached to a flexure element, the plurality of resistors including two resistors disposed at locations at which the two resistors are opposite to each other, such that the flexure element is interposed between the two resistors.

13 Claims, 7 Drawing Sheets

(56) References Cited

U.S. PATENT DOCUMENTS

| | | | | |
|---|---|---|---|---|
| 2002/0163614 | A1* | 11/2002 | Hinata | ................ H01L 27/3211 |
| | | | | 349/139 |
| 2005/0188769 | A1 | 9/2005 | Moelkner et al. | |
| 2019/0299352 | A1* | 10/2019 | Michiwaki | .............. B23B 29/12 |
| 2020/0141822 | A1* | 5/2020 | Unyong | ................ H01L 41/187 |
| 2021/0033476 | A1* | 2/2021 | Toda | ........................ G01B 7/18 |
| 2021/0063133 | A1* | 3/2021 | Misaizu | ................... G01B 7/20 |

FOREIGN PATENT DOCUMENTS

| | | |
|---|---|---|
| JP | H06-186096 | 7/1994 |
| JP | H06-300649 | 10/1994 |
| JP | H07-009034 | 1/1995 |
| JP | H08-102163 | 4/1996 |
| JP | H08-152962 | 6/1996 |
| JP | H09-016941 | 1/1997 |
| JP | H10-270201 | 10/1998 |
| JP | 2007-173544 | 7/2007 |
| JP | 2015-031633 | 2/2015 |
| JP | 2016-074934 | 5/2016 |
| JP | 2016-136605 | 7/2016 |
| JP | 2017-101983 | 6/2017 |

OTHER PUBLICATIONS

Office Action dated Nov. 16, 2021 with respect to the corresponding Chinese patent application No. 201880090127.3.
Office Action dated Jan. 25, 2022 with respect to the corresponding Japanaese patent application No. 2017-254442.

* cited by examiner

STRAIN GAUGE AND SENSOR MODULE

TECHNICAL FIELD

The present invention relates to a strain gauge and a sensor module.

BACKGROUND ART

A strain gauge is known to be attached to a measured object to detect strain of the measured object. The strain gauge includes a resistor for detecting strain, and as a resistor material, for example, material including Cr (chromium) or Ni (nickel) is used. One resistor is formed on one surface of a substrate made of, for example, an insulating resin (see, for example, Patent document 1).

CITATION LIST

Patent Document

[Patent document 1] Japanese Unexamined Patent Application Publication No. 2016-74934

SUMMARY

There are cases of measuring strain, where a plurality of strain gauges each including one resistor are prepared and are attached to different surfaces of a flexure element. In this case, time is required for the individual strain gauges to be attached to the different surfaces of the flexure element, and thus work efficiency is required to be improved.

In view of the point described above, an object of the present invention is to provide a strain gauge that allows for work efficiency of attachment to a flexure element.

A strain gauge includes a flexible substrate, and a plurality of resistors each formed of a Cr composite film, on or above the substrate. The substrate is attached to a flexure element, the plurality of resistors including two resistors disposed at locations at which the two resistors are opposite to each other, such that the flexure element is interposed between the two resistors.

Effects of the Invention

According to the disclosed technique, a strain gauge that allows for work efficiency of attachment to a flexure element can be provided.

DESCRIPTION OF EMBODIMENTS

One or more embodiments will be hereinafter described with reference to the drawings. In each figure, the same numerals denote the same components; accordingly, duplicative explanations may be omitted.

First Embodiment

Figure 1:
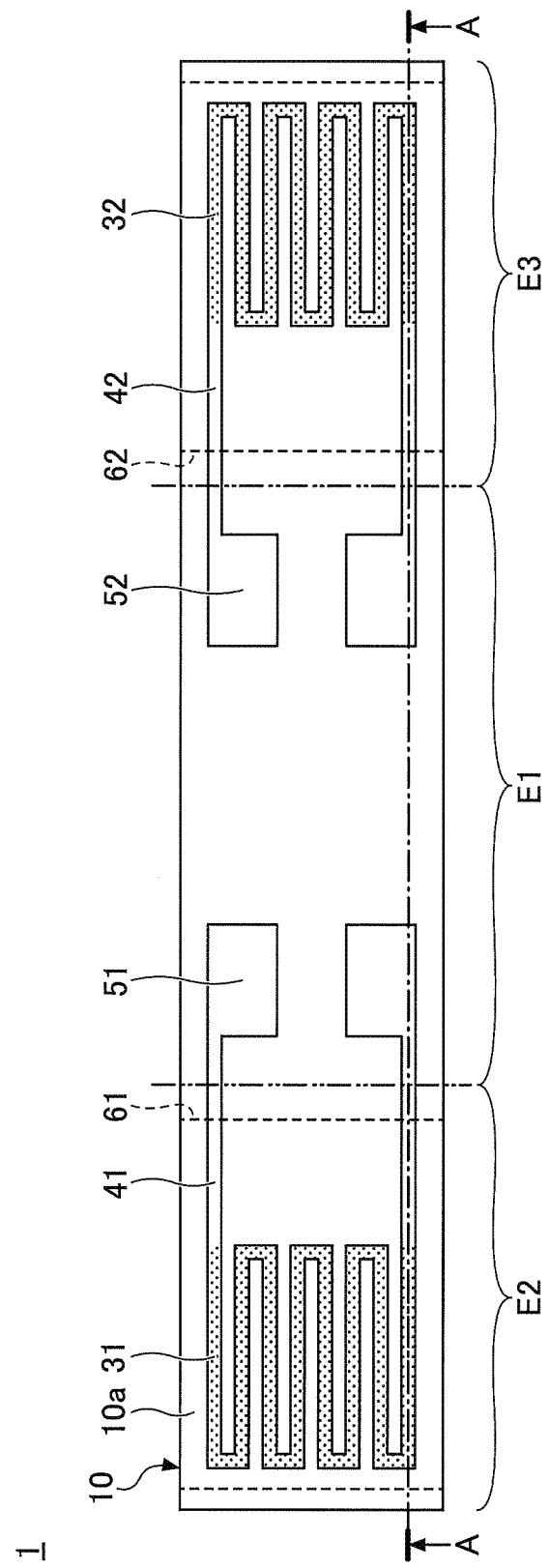
FIG. 1 is a plan view of an example of a strain gauge according to a first embodiment.
Figure 2:
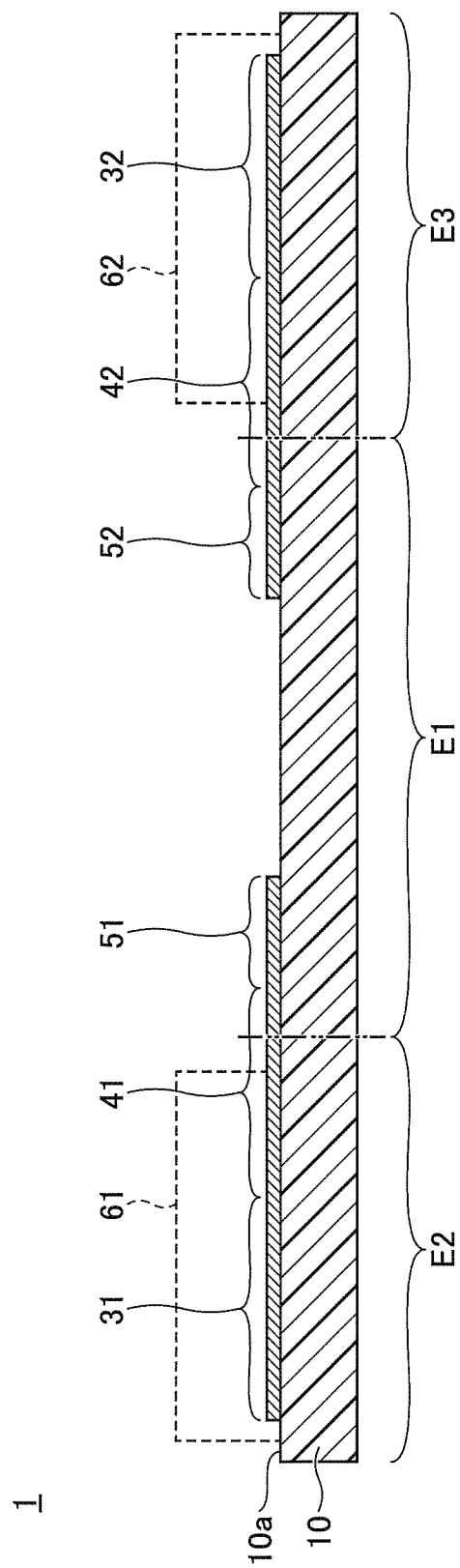
FIG. 2 is a cross-sectional view (part 1) of an example of the strain gauge according to the first embodiment.

FIG. 1 is a plan view of an example of a strain gauge according to a first embodiment. FIG. 2 is a cross-sectional view of an example of the strain gauge according to the first embodiment, and illustrates a cross section taken along the A-A line in FIG. 1. With reference to FIGS. 1 and 2, the strain gauge 1 includes a substrate 10; resistors 31 and 32; interconnect patterns 41 and 42; and terminal sections 51 and 52.

Note that in the present embodiment, for the sake of convenience, with respect to the strain gauge 1, the side of the substrate 10 where the resistors 31 and 32 are provided is referred to as an upper side or one side; and the side of the substrate 10 where the resistors 31 and 32 are not provided is referred to as a lower side or another side. Further, for each component, the surface on the side where the resistors 31 and 32 are provided is referred to as one surface or an upper surface; and the surface on the side where the resistors 31 and 32 are not provided is referred to as another surface or a lower surface. However, the strain gauge 1 can be used in a state of being upside down, or be disposed at any angle. Further, a plan view means that an object is viewed from a direction normal to an upper surface 10a of the substrate 10, and a planar shape refers to a shape of an object when viewed from the direction normal to the upper surface 10a of the substrate 10.

The substrate 10 is a member that is a base layer for forming the resistors 31 and 32 and the like and is flexible. According to the present embodiment, the planar shape of the substrate 10 is a strip shape. The thickness of the substrate 10 is not particularly restricted, and can be appropriately selected for any purpose. For example, such a thickness can be approximately between 5 μm and 1000 μm. In particular, when the thickness of the substrate 10 is between 5 μm and 200 μm, it is preferable in terms of strain transfer from a flexure element surface that is bonded to a lower surface of the substrate 10 via an adhesive layer or the like; and dimensional stability with respect to environment, and when the thickness is 10 μm or more, it is further preferable in terms of insulation.

The substrate 10 can be formed of an insulating resin film such as a PT (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

Each of the resistors 31 and 32 is formed on the substrate 10 and is a sensitive section where resistance varies according to strain. The resistors 31 and 32 can be disposed on the substrate 10, such that grid directions of the resistors are toward the same direction. Note that in FIG. 1, for the sake of convenience, each of the resistors 31 and 32 is illustrated in a crepe pattern.

Each of the resistor 31 and 32 can be formed of, for example, material including Cr (chromium); material including Ni (nickel); or material including both of Cr and Ni. In other words, each of the resistors 31 and 32 can be formed of material including at least one from among Cr and Ni. An example of the material including Cr includes a Cr composite film. An example of the material including Ni includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide.

The thickness of each of the resistors 31 and 32 is not particularly restricted, and can be appropriately selected for any purpose. The thickness can be, for example, approximately between 0.05 μm and 2 μm. In particular, when the thickness of each of the resistors 31 and 32 is 0.1 μm or more, it is preferable in terms of improvement in crystallinity (e.g., crystallinity of α-Cr) of a crystal that constitutes a given resistor from among the resistors 31 and 32, and when the thickness of each of the resistors 31 and 32 is 1 μm or less, it is further preferable in terms of reduction in cracks of a given film caused by internal stress of the film that constitutes a given resistor from among the resistors 31 and 32, or reduction in warp in the substrate 10.

For example, when each of the resistors 31 and 32 is the Cr composite film, the resistor is formed with α-Cr (alpha-chromium) as the main component having a stable crystalline phase, so that stability of the gauge characteristics can be improved. Additionally, when each of the resistors 31 and 32 is formed with α-Cr as the main component, a gauge factor of the strain gauge 1 can be 10 or more, as well as a gauge factor temperature coefficient TCS and temperature coefficient of resistance TCR being able to be each in the range of from −1000 ppm/° C. to +1000 ppm/° C. Here, a main component means that a target substance is 50% by weight or more of total substances that constitute the resistor. Each of the resistors 31 and 32 preferably includes α-Cr at 80% by weight or more, from the viewpoint of improving the gauge characteristics. Note that α-Cr is Cr having a bcc structure (body-centered cubic structure).

The terminal sections 51 respectively extend from both end portions of the resistor 31 via the interconnect pattern 41, and are each wider than the resistor 31 to be formed to have an approximately rectangular shape in a plan view. The terminal sections 51 are a pair of electrodes from which a change in a resistance value of the resistor 31 according to strain is output externally, where, for example, a lead wire for an external connection, or the like is joined. For example, the resistor 31 extends from one of the terminal sections 51 via the interconnect pattern 41, with zigzagged hairpin turns, to be connected to another terminal section 51 via the interconnect pattern 41.

The terminal sections 52 respectively extend from both end portions of the resistor 32 via the interconnect pattern 42, and are each wider than the resistor 32 to be formed to have an approximately rectangular shape in a plan view. The terminal sections 52 are a pair of electrodes from which a change in a resistance value of the resistor 32 according to strain is output externally, where, for example, a lead wire for an external connection, or the like is joined. For example, the resistor 32 extends from one of the terminal sections 52 via the interconnect pattern 42, with zigzagged hairpin turns, to be connected to another terminal section 52 via the interconnect pattern 42.

The upper surfaces of the terminal sections 51 and 52 may be coated with a metal allowing for greater solderability than the terminal sections 51 and 52. Note that for the sake of convenience, the resistors 31 and 32, the interconnect patterns 41 and 42, and the terminal sections 51 and 52 are expressed by different numerals. However, the resistors, the interconnect patterns, and the terminal sections can be integrally formed of the same material, in the same process.

A cover layer 61 (insulating resin layer) may be provided on and above the upper surface 10a of the substrate 10, such that the resistor 31 is coated and the terminal sections 51 are exposed. With the cover layer 61 being provided, mechanical damage, and the like can be prevented from occurring in the resistor 31. Additionally, with the cover layer 61 being provided, the resistor 31 can be protected against moisture, and the like. Note that the cover layer 61 may be provided to cover a wider area excepting the terminal sections 51.

A cover layer 62 (insulating resin layer) may be provided on and above the upper surface 10a of the substrate 10, such that the resistor 32 is coated and the terminal sections 52 are exposed. With the cover layer 62 being provided, mechanical damage, and the like can be prevented from occurring in the resistor 32. Additionally, with the cover layer 62 being provided, the resistor 32 can be protected against moisture, and the like. Note that the cover layer 62 may be provided to cover a wider area excepting the terminal sections 52.

Each of the cover layers 61 and 62 can be formed of an insulating resin such as a PI resin, an epoxy resin, a PEEK resin, a PEN resin, a PET resin, a PPS resin, or a composite resin (e.g., a silicone resin or a polyolefin resin). Each of the cover layers 61 and 62 may contain fillers or pigments. The thickness of each of the cover layers 61 and 62 is not particularly restricted, and can be appropriately selected for any purpose. For example, the thickness may be approximately between 2 μm and 30 μm.

Figure 3:
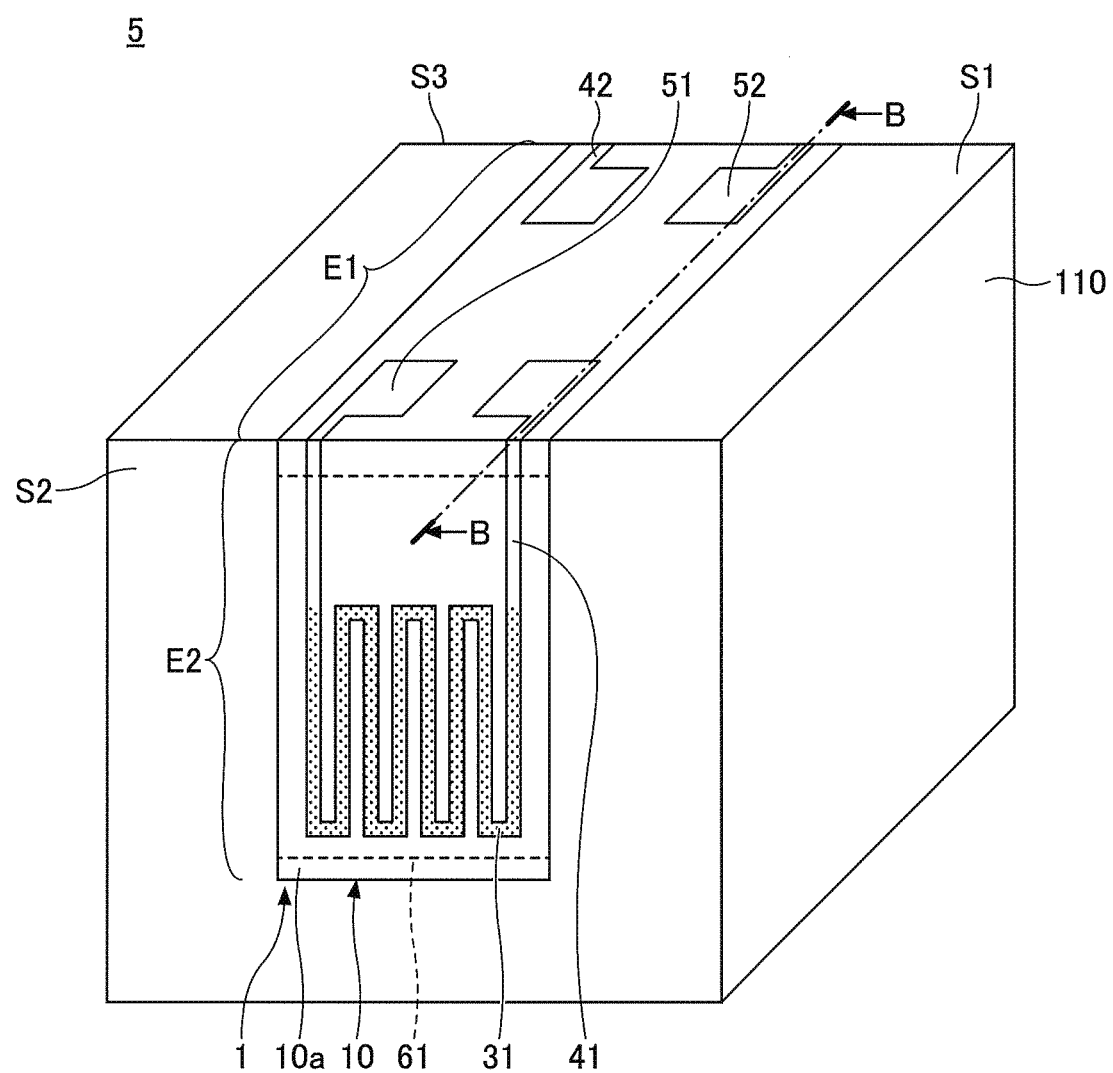
FIG. 3 is a perspective view of an example of a sensor module according to the first embodiment.
Figure 4:
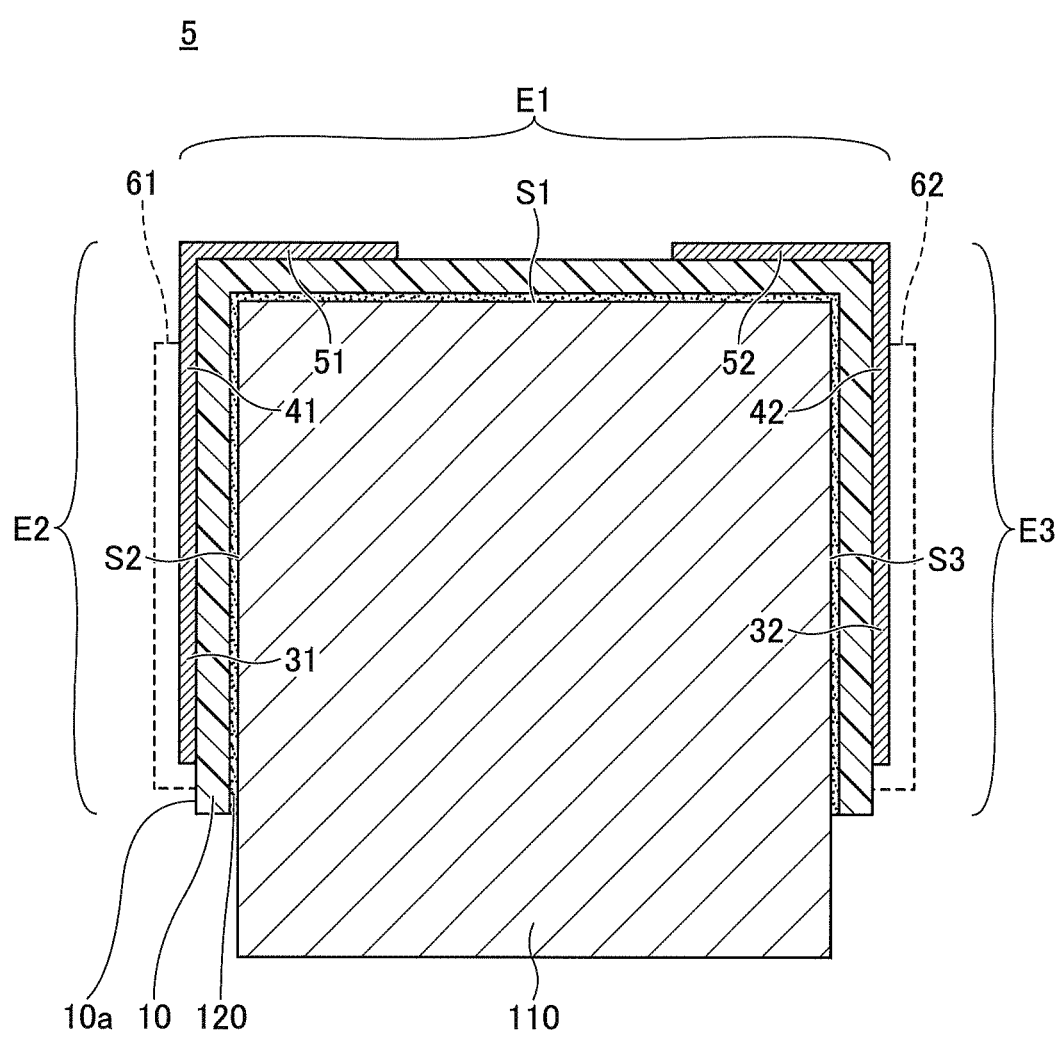
FIG. 4 is a cross-sectional view of an example of the sensor module according to the first embodiment.

FIG. 3 is a perspective view of an example of a sensor module according to the first embodiment. FIG. 4 is a cross-sectional view of an example of the sensor module according to the first embodiment, and illustrates a cross section taken along the B-B line in FIG. 3. Note that in FIGS. 2 and 4, dimensional ratios for each component are changed for the sake of convenience.

Referring to FIGS. 1 to 4, the substrate 10 in the strain gauge 1 includes a first region E1 where the first surface S1 of a flexure element 110 can be attached, and includes a second region E2 and a third region E3 where the second surface S2 and the third surface S3 of the flexure element that are each adjacent to the first surface S1 of the flexure element 110 and that are opposite to each other can be attached.

In the strain gauge 1, the terminal sections 51 and 52 each of which becomes an electrode are disposed in the first region E1. In the strain gauge 1, the resistor 31 is disposed in the second region E2, and the resistor 32 is disposed in the third region E3. For the strain gauge 1, when the substrate 10 is attached to the flexure element 110, the resistor 31 and the resistor 32 are disposed at locations at which the resistors are opposite to each other, such that the flexure element 110 is interposed between the resistors.

The sensor module 5 includes the strain gauge 1, the flexure element 110, and an adhesive layer 120. In the sensor module 5, the substrate 10 is secured to the surface of the flexure element 110, via the adhesive layer 120. More specifically, the first region E1 of the substrate 10 is secured to the first surface S1 of the flexure element 110 via the adhesive layer 120, the second region E2 of the substrate is secured to the second surface S2 of the flexure element via the adhesive layer 120, and the third region E3 of the substrate is secured to the third surface S3 of the flexure element via the adhesive layer 120.

In other words, in the sensor module 5, the terminal sections 51 and 52 each of which becomes an electrode are disposed above the first surface S1 of the flexure element 110, the resistor 31 is disposed above the second surface S2 of the flexure element 110, and the resistor 32 is disposed above the third surface S3 of the flexure element 110. The resistor 31 disposed above the second surface S2 of the flexure element; and the resistor 32 disposed above the third surface S3 of the flexure element are opposite to each other, such that the flexure element 110 is interposed between the resistor 31 and the resistor 32.

Note that in the example of FIGS. 1 to 4, the terminal sections 51 and 52 are disposed in the first region E1, but are not limited thereto. The terminal sections 51 may be disposed in the second region E2 and the terminal sections 52 may be disposed in the third region E3. However, the terminal sections 51 and 52 are preferably disposed in the first region E1 in terms of improvement of workability. This is because, when the terminal sections 51 and 52 are disposed in the first region E1, the connections with the terminal sections 51 and 52, via a lead wire or the like, are achieved using only the same surface (first surface S1) of the sensor module 5.

The flexure element 110 is a body that is formed of a metal such as Fe, SUS (stainless steel) or Al, or, a resin such as PEEK, and that is deformed (causes strain) according to an applied force. The strain gauge 1 can detect strain generated in the flexure element 110, as a change in resistance of the resistors 31 and 32.

The material of the adhesive layer 120 is not particularly restricted as long as it has a function of securing the strain gauge 1 to the flexure element 110. The material can be appropriately selected for any purpose. For example, an epoxy resin, a modified epoxy resin, a silicone resin, a modified silicone resin, a urethane resin, a modified urethane resin, or the like can be used. Also, material such as a bonding sheet may be used. The thickness of the adhesive layer 120 is not particularly restricted, and can be appropriately selected for any purpose. For example, the thickness can be approximately between 0.1 µm and 50 µm.

In order to manufacture the strain gauge 1, first, the substrate 10 is prepared, and a metallic layer (which is referred to as a metallic layer 300, for the sake of convenience) is finally patterned on the entire upper surface 10a of the substrate 10 to thereby become the resistors 31 and 32, the interconnect patterns 41 and 42, and the terminal sections 51 and 52. The material and thickness of the metallic layer 300 are the same as the material and thickness for each of the resistors 31 and 32; the interconnect patterns 41 and 42; and the terminal sections 51 and 52, as described above.

The metallic layer 300 can be deposited by magnetron sputtering in which, for example, a raw material capable of forming the metallic layer 300 is the target. Instead of the magnetron sputtering, the metallic layer 300 may be deposited by reactive sputtering, vapor deposition, arc ion plating, pulsed laser deposition, or the like.

From the viewpoint of stabilizing the gauge characteristics, before depositing the metallic layer 300, preferably, as a base layer, a functional layer having a film thickness that is approximately between 1 nm and 100 nm is vacuum-deposited on the upper surface 10a of the substrate 10, by conventional sputtering, for example.

In the present application, the functional layer refers to a layer that has a function of promoting crystal growth of the resistors 31 and 32 (where the metallic layer 300 is patterned) each of which is at least an upper layer. The functional layer preferably further has a function of preventing oxidation of the resistors 31 and 32 caused by oxygen and moisture included in the substrate 10, as well as a function of improving adhesion between the substrate 10 and each of the resistors 31 and 32. The functional layer may further have other functions.

The insulating resin film that constitutes the substrate 10 contains oxygen and moisture. In this regard, particularly when each of the resistors 31 and 32 includes Cr, it is effective for the functional layer to have a function of preventing oxidation of the resistors 31 and 32, because Cr forms an autoxidized film.

The material of the functional layer is not particularly restricted as long as it is material having a function of promoting crystal growth of the resistors 31 and 32 each of which is at least an upper layer. Such material can be appropriately selected for any purpose, and includes one or more types of metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and in which an Ar (argon) gas is supplied to a chamber. By using conventional sputtering, the functional layer is deposited while the upper surface 10a of the substrate 10 is etched with Ar. Thus, a deposited amount of film of the functional layer is minimized and thus an effect of improving adhesion can be obtained.

However, this is an example of a method of depositing the functional layer, and the functional layer may be deposited by other methods. For example, as such a method, before depositing the functional layer, the upper surface 10a of the substrate 10 is activated by plasma treatment using Ar, etc. or the like to thereby obtain the effect of improving the adhesion; subsequently, the functional layer may be vacuum-deposited by magnetron sputtering.

A combination of the material of the functional layer; and the material of the metallic layer 300 that becomes the resistors 31 and 32 and the like is not particularly restricted, and can be appropriately selected for any purpose. For example, Ti is used for the functional layer, and a Cr composite film formed with α-Cr (alpha-chromium) as the main component can be deposited as the metallic layer 300.

In this case, the metallic layer 300 can be deposited by, for example, magnetron sputtering in which a raw material capable of forming the Cr composite film is the target and in which an Ar gas is supplied to a chamber. Alternatively, the metallic layer 300 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer formed of Ti, and a Cr composite film that is formed with α-Cr as the main component having a stable crystalline structure can be deposited. Also, Ti that constitutes the functional layer is diffused into the Cr composite film, so that the gauge characteristics are improved. For example, the gauge factor of the strain gauge 1 can be 10 or more, as well as the gauge factor temperature coefficient TCS and temperature coefficient of resistance TCR being able to be each in the range of from −1000 ppm/° C. to +1000 ppm/° C. Note that, when the functional layer is formed of Ti, the Cr composite film may include Ti or TiN (titanium nitride).

Note that when each of the resistors 31 and 32 is a Cr composite film, the functional layer formed of Ti includes all functions of a function of promoting crystal growth of the resistors 31 and 32; a function of preventing oxidation of the resistors 31 and 32 caused by oxygen or moisture contained in the substrate 10; and a function of improving adhesion between the substrate 10 and each of the resistors 31 and 32. Instead of Ti, when the functional layer is formed of Ta, Si, Al, or Fe, the functional layer also includes the same functions.

As described above, with the functional layer being provided in the lower layer of the resistors 31 and 32, the crystal growth of the resistors 31 and 32 can be promoted and thus the resistors 31 and 32 each having a stable crystalline phase can be fabricated. As a result, with respect to the strain gauge 1, the stability of the gauge characteristics can be improved. Also, the material that constitutes the functional layer is diffused into the resistors 31 and 32, so that the gauge characteristics of the strain gauge 1 can be thereby improved.

After forming the functional layer and the metallic layer 300 on and above the entire upper surface 10a of the substrate 10, the functional layer and the metallic layer 300 formed on and above the upper surface 10a of the substrate 10 are patterned by photolithography to have the shape in FIG. 1. Thereby, the resistors 31 and 32, the interconnect patterns 41 and 42, and the terminal sections 51 and 52 are formed.

After forming the resistors 31 and 32; the interconnect patterns 41 and 42; and the terminal sections 51 and 52, the cover layer 61 with which the resistor 31 is coated and that exposes the terminal sections 51, as well as the cover layer 62 with which the resistor 32 is coated and that exposes the terminal sections 52, are provided on and above the upper surface 10a of the substrate 10, as necessary, so that the strain gauge 1 is completed. For example, the cover layers 61 and 62 can be fabricated, such that a thermosetting insulating resin film in a semi-cured state is laminated on the upper surface 10a of the substrate 10, such that the resistor 31 is coated and the terminal sections 51 are exposed, and such that the resistor 32 is coated and the terminal sections 52 are exposed; subsequently, heat is added and curing is performed. The cover layers 61 and 62 may be formed, such that a thermosetting insulating resin that is liquid or paste-like is applied to the upper surface 10a of the substrate 10, such that the resistor 31 is coated and the terminal sections 51 are exposed, and such that the resistor 32 is coated and the terminal sections 52 are exposed; subsequently, heat is added and curing is performed.

Figure 5:
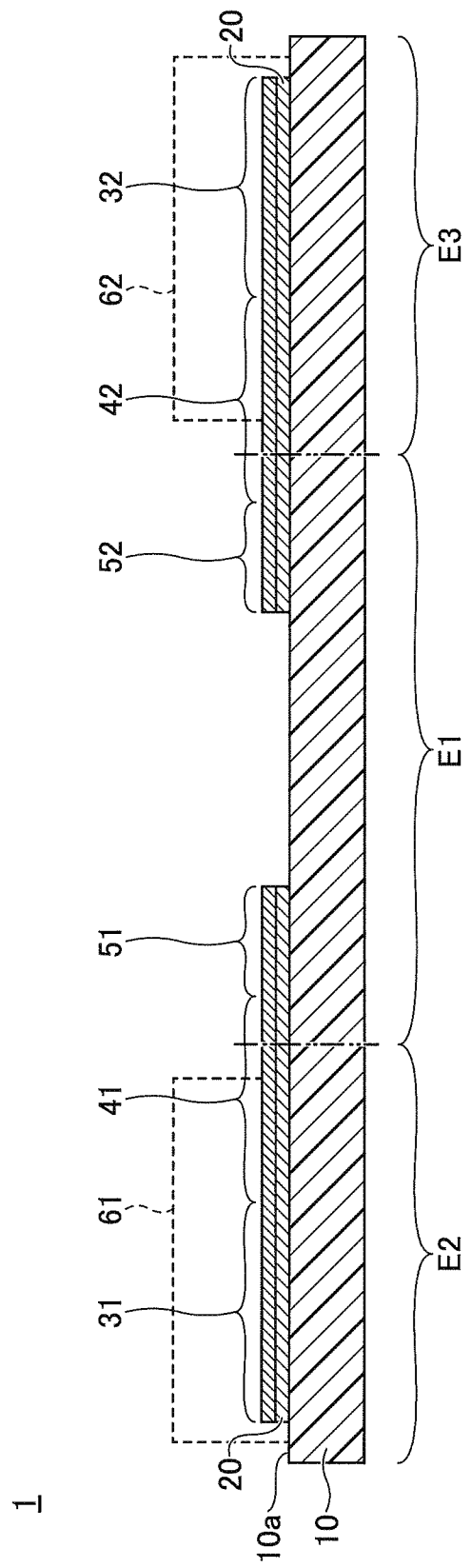
FIG. 5 is a cross-sectional view (part 2) of an example of the strain gauge according to the first embodiment.

Note that when the functional layer, as a base layer of the resistors 31 and 32; the interconnect patterns 41 and 42; and the terminal sections 51 and 52, is provided on the upper surface 10a of the substrate 10, the strain gauge 1 has a cross-section shape illustrated in FIG. 5. A layer expressed by the numeral 20 indicates the functional layer. The planar shape of the strain gauge 1 in the case of providing the functional layer 20 is the sane as that in FIG. 1.

In order to manufacture the sensor module 5, after the strain gauge 1 is fabricated, the substrate 10 of the strain gauge 1 is attached to the flexure element 110. Specifically, for example, any material described above, which constitutes, for example, the adhesive layer 120, is applied to the lower surface of the substrate 10 and/or the surfaces (predetermined regions of the first surface S1, the second surface S2, and the third surface S3) of the flexure element 110. Then, the lower surface of the substrate 10 is situated facing a given surface of the flexure element 110, and the strain gauge 1 is disposed above the flexure element 110, via the applied material. Alternatively, a bonding sheet may be interposed between the flexure element 110 and the substrate 10.

Next, the strain gauge 1 is heated to a predetermined temperature while being pressed toward the flexure element 110, and the applied material is cured, so that the adhesive layer 120 is formed. Thereby, the lower surface of the substrate 10 is secured to the surfaces of the flexure element 110, via the adhesive layer 120, so that the sensor module 5 is completed. For example, the sensor module 5 can be applied in measurement of load, pressure, torque, acceleration, or the like.

As described above, in the sensor module 5, the resistor 31 and the resistor 32 are disposed at locations where the resistors are opposite to each other, such that the flexure element 110 is interposed between the resistors. In such a manner, for example, when a bending moment of which the tensile side is the second surface S2 of the flexure element 110 and of which the compressive side is the third surface S3 thereof is created, for the output of the terminal sections 51 connected to the resistor 31 that is disposed above the second surface S2 of the flexure element; and the output of the terminal sections 52 connected to the resistor 32 that is disposed above the third surface S3 thereof, respective absolute values are identical and respective signs are opposite. As a result, when the outputs of the terminal sections 51 and the outputs of the terminal sections 52 are connected to a Wheatstone bridge to detect strain, detection sensitivity can be improved.

With use of one strain gauge 1 in which the plurality of resistors are patterned, attachment work is efficiently achieved in comparison to the case where a plurality of strain gauges are used to be individually attached to the flexure element 110. Further, with use of the strain gauge 1, the number of components in the sensor module 5 can be reduced in comparison to the case where the plurality of strain gauges are used to be individually attached to the flexure element 110. Accordingly, reliability of the sensor module 5 can be improved.

Modification 1 of the First Embodiment

Modification 1 of the first embodiment will be described using an example of a strain gauge and a sensor module each of which includes four resistors. Note that in the modification 1 of the first embodiment, explanation for the same components as the embodiments that have been described may be omitted.

Figure 6:
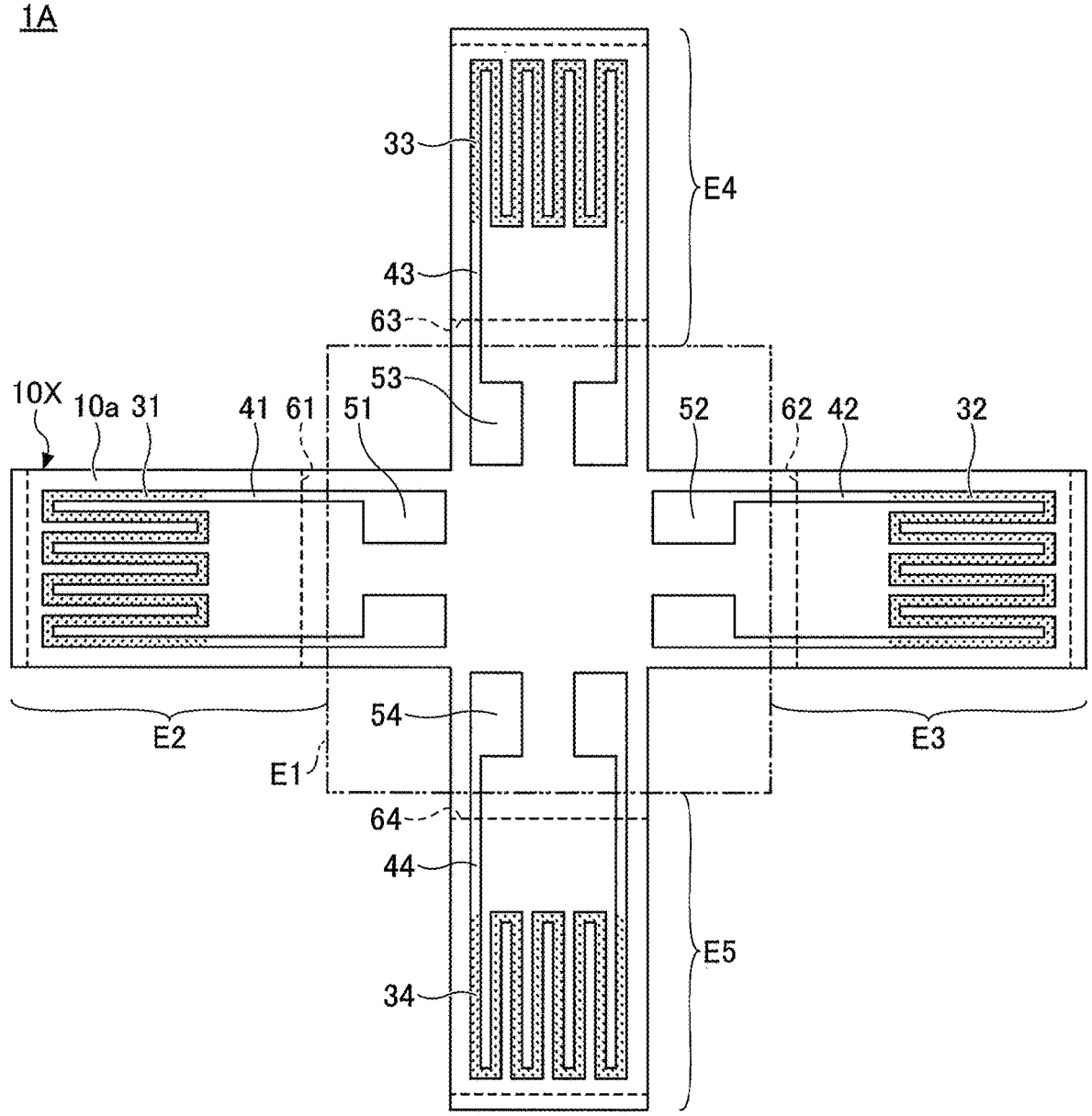
FIG. 6 is a plan view of an example of a strain gauge according to modification 1 of the first embodiment.
Figure 7:
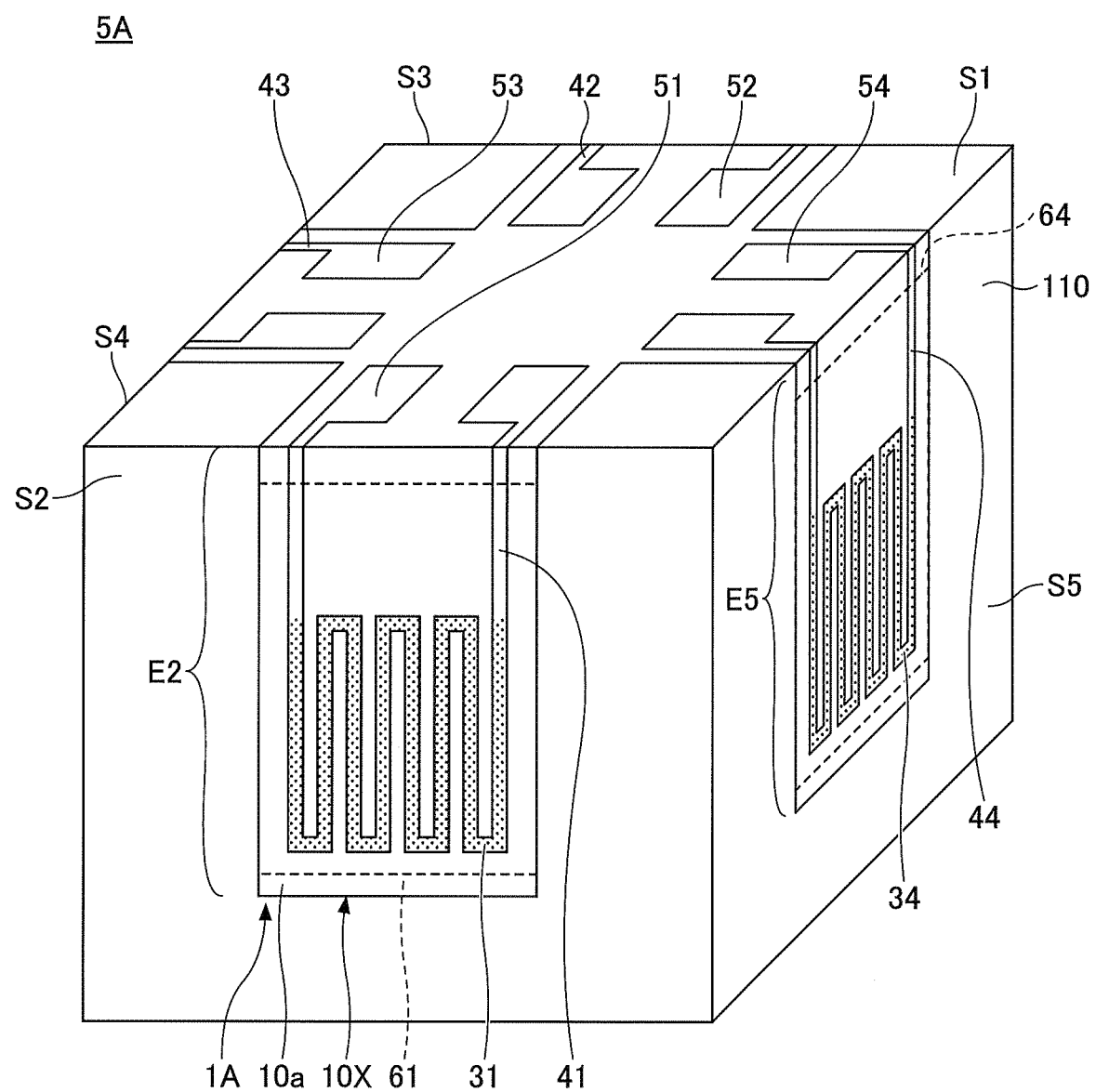
FIG. 7 is a perspective view of an example of a sensor module according to the modification 1 of the first embodiment.

FIG. 6 is a plan view of an example of the strain gauge according to the modification 1 of the first embodiment. FIG. 7 is a perspective view of an example of the sensor module according to the modification 1 of the first embodiment. Note that the cross section shapes of the strain gauge and the sensor module according to the modification 1 of the first embodiment are the same as those in FIGS. 2 and 4; accordingly, illustrations of those cross section shapes will be omitted.

Referring to FIG. 6, the strain gauge 1A includes a substrate 10X of which the planar shape is a cross shape. On the substrate 10X, the resistor 31; the interconnect pattern 41; the terminal sections 51; the resistor 32; the interconnect pattern 42; and the terminal sections 52 are provided, as is arranged in the strain gauge 1. Further, on the substrate 10X, a resistor 33; an interconnect pattern 43; terminal sections 53; a resistor 34; an interconnect pattern 44; and terminal sections 54 are provided.

Each of the resistors 33 and 34 is formed on the substrate 10X, and is a sensitive section in which resistance varies according to strain. For example, the resistors 33 and 34 can be disposed, such that grid directions of the resistors are toward the same direction. For example, the resistors 33 and 34 and the resistors 31 and 32 can be disposed on the substrate 10X, such that the grid direction of the resistors 33 and 34 is toward a direction perpendicular to the grid direction of the resistors 31 and 32. The materials and thicknesses for the substrate 10X and the resistors 33 and 34 can be, for example, the same as the materials and thicknesses for the substrate 10 and the resistors 31 and 32. Note that in FIG. 6, for the sake of convenience, the resistors 31, 32, 33, and 34 are each illustrated in a crepe pattern.

The terminal sections 53 respectively extend from both end portions of the resistor 33 via the interconnect pattern 43, and are each wider than the resistor 33 to be formed to have an approximately rectangular shape in a plan view. The terminal sections 53 are a pair of electrodes from which a change in a resistance value of the resistor 33 according to strain is output externally, where, for example, a lead wire for an external connection, or the like is joined. For example, the resistor 33 extends from one of the terminal sections 53 via the interconnect pattern 43, with zigzagged hairpin turns, to be connected to another terminal section 53 via the interconnect pattern 43.

The terminal sections 54 respectively extend from both end portions of the resistor 34 via the interconnect pattern 44, and are each wider than the resistor 34 to be formed to have an approximately rectangular shape in a plan view. The terminal sections 54 are a pair of electrodes from which a change in a resistance value of the resistor 34 according to strain is output externally, where, for example, a lead wire for an external connection, or the like is joined. For example, the resistor 34 extends from one of the terminal sections 54 via the interconnect pattern 44, with zigzagged hairpin turns, to be connected to another terminal section 54 via the interconnect pattern 44.

The upper surfaces of the terminal sections 53 and 54 may be coated with a metal allowing for greater solderability than the terminal sections 53 and 54. Note that for the sake of convenience, the resistors 31, 32, 33 and 34; the interconnect patterns 41, 42, 43 and 44; and the terminal sections 51, 52, 53 and 54 are expressed by different numerals. However, the resistors, the interconnect patterns, and the terminal sections can be integrally formed of the same material, in the same process.

A cover layer 63 (insulating resin layer) may be provided on and above the upper surface 10a of the substrate 10X, such that the resistor 33 is coated and the terminal sections 53 are exposed. With the cover layer 63 being provided, mechanical damage, and the like can be prevented from occurring in the resistor 33. Additionally, with the cover layer 63 being provided, the resistor 33 can be protected against moisture, and the like. Note that the cover layer 63 may be provided to cover a wider area excepting the terminal sections 53.

A cover layer 64 (insulating resin layer) may be provided on and above the upper surface 10a of the substrate 10X, such that the resistor 34 is coated and the terminal sections 54 are exposed. With the cover layer 64 being provided, mechanical damage, and the like can be prevented from occurring in the resistor 34. Additionally, with the cover layer 64 being provided, the resistor 34 can be protected against moisture, and the like. Note that the cover layer 64 may be provided to cover a wider area excepting the terminal sections 54. The materials and thicknesses for the cover layers 63 and 64 can be the same as the materials and thicknesses for the cover layers 61 and 62.

Referring to FIGS. 6 and 7, the substrate 10X in the strain gauge 1A includes the first region E1 where the first surface S1 of the flexure element 110 can be attached. The substrate 10X includes the second region E2 and the third region E3 where the second surface S2 and the third surface S3 of the flexure element that are each adjacent to the first surface S1 of the flexure element 110 and that are opposite to each other can be attached. The substrate 10X includes a fourth region E4 and a fifth region E5 where the fourth surface S4 and the fifth surface S5 of the flexure element that are each adjacent to the first surface S1 of the flexure element 110 and that are opposite to each other can be attached.

In the strain gauge 1A, the terminal sections 51, 52, 53, and 54 each of which becomes an electrode are disposed in the first region E1. In the strain gauge 1A, the resistor 31 is disposed in the second region E2, the resistor 32 is disposed in the third region E3, the resistor 33 is disposed in the fourth region E4, and the resistor 34 is disposed in the fifth region E5. For the strain gauge 1A, when the substrate 10X is attached to the flexure element 110, the resistor 31 and the resistor 32 are disposed at locations at which the resistors are opposite to each other, such that the flexure element 110 is interposed between the resistors. When the substrate 10X is attached to the flexure element 110, the resistor 33 and the resistor 34 are disposed at locations at which the resistors are opposite to each other, such that the flexure element 110 is interposed between the resistors.

The sensor module 5A includes the strain gauge 1A, the flexure element 110, and the adhesive layer 120. In the sensor module 5A, the substrate 10X is secured to the surfaces of the flexure element 110, via the adhesive layer 120. More specifically, the first region E1 of the substrate 10X is secured to the first surface S1 of the flexure element 110 via the adhesive layer 120; the second region E2 of the substrate is secured to the second surface S2 of the flexure element via the adhesive layer 120; and the third region E3 of the substrate is secured to the third surface S3 of the flexure element via the adhesive layer 120. The fourth region E4 of the substrate is secured to the fourth surface S4 of the flexure element via the adhesive layer 120, and the fifth region E5 of the substrate is secured to the fifth surface S5 of the flexure element via the adhesive layer 120.

In other words, in the sensor module 5A, the terminal sections 51, 52, 53 and 54 each of which becomes an electrode are disposed above the first surface S1 of the flexure element 110, the resistor 31 is disposed above the second surface S2 of the flexure element 110, and the resistor 32 is disposed above the third surface S3 of the flexure element 110. The resistor 33 is disposed above the fourth surface S4 of the flexure element 110, and the resistor 34 is disposed above the fifth surface S5 of the flexure element 110. The resistor 31 disposed above the second surface S2 of the flexure element; and the resistor 32 disposed above the third surface S3 of the flexure element are opposite to each other, such that the flexure element 110 is interposed between the resistors. The resistor 33 disposed above the fourth surface S4 of the flexure element; and the resistor 34 disposed above the fifth surface S5 of the flexure element are opposite to each other, such that the flexure element 110 is interposed between the resistors.

As described above, in the sensor module 5A, the resistor 31 and the resistor 32 are disposed at locations at which the resistors are opposite to each other, such that the flexure element 110 is interposed between the resistors. In such a manner, for example, when a bending moment of which the tensile side is the second surface S2 of the flexure element 110 and of which the compressive side is the third surface S3 thereof is created, for the output of the terminal sections 51 connected to the resistor 31 that is disposed above the second surface S2 of the flexure element; and the output of the terminal sections 52 connected to the resistor 32 that is disposed above the third surface S3 thereof, respective absolute values are identical and respective signs are opposite. As a result, when the outputs of the terminal sections 51 and the outputs of the terminal sections 52 are connected to a Wheatstone bridge to detect strain, detection sensibility can be improved.

Similarly, in the sensor module 5A, the resistor 33 and the resistor 34 are disposed at locations at which the resistors are opposite to each other, such that the flexure element 110 is interposed between the resistors. In such a manner, for example, when a bending moment of which the tensile side is the fourth surface S4 of the flexure element 110 and of which the compressive side is the fifth surface S5 thereof is created, for the output of the terminal sections 53 connected to the resistor 33 that is disposed above the fourth surface S4 of the flexure element; and the output of the terminal sections 54 connected to the resistor 34 that is disposed above the fifth surface S5 thereof, respective absolute values are identical and respective signs are opposite. As a result, when the outputs of the terminal sections 53 and the outputs of the terminal sections 54 are connected to a Wheatstone bridge to detect strain, detection sensibility can be improved.

With use of one strain gauge 1A in which the plurality of resistors are patterned, attachment work is achieved efficiently in comparison to the case where a plurality of strain gauges are used to be individually attached to the flexure element 110. Further, with use of the strain gauge 1A, the number of components in the sensor module 5A can be reduced in comparison to the case where the plurality of strain gauges are used to be individually attached to the flexure element 110. Accordingly, reliability of the sensor module 5A can be improved.

The preferred embodiment and the like have been described above in detail, but are not limited thereto. Various modifications and alternatives to the above embodiment and the like can be made without departing from a scope set forth in the claims.

For example, the first embodiment has been described using an example of a strain gauge including two resistors, and the modification 1 of the first embodiment has been described using an example of a strain gauge including four resistors. However, for the strain gauge according to the present invention, when the substrate is attached to the flexure element, and the strain gauge includes at least two resistors that are disposed at locations at which the resistors are opposite to each other, such that the flexure element is interposed between the resistors, the strain gauge may include any number of resistors.

Further, the first embodiment has been described using an example of a strain gauge having the substrate of which the planar shape is a strip shape, and the modification 1 of the first embodiment has been described using an example of a strain gauge including the substrate of which the planar shape is a cross shape. However, for the strain gauge according to the present invention, when the substrate is attached to the flexure element, and the strain gauge includes at least two resistors that are disposed at locations at which the resistors are opposite to each other, such that the flexure element is interposed between the resistors, the substrate may have any planar shape. In this regard, the planar shape is not limited to a simple planar shape such as a strip shape or a cross shape, and may be a complicated planar shape corresponding to the flexure element shape.

This International application claims priority to Japanese Patent Application No. 2017-254442, filed Dec. 28, 2017, the contents of which are incorporated herein by reference in their entirety.

REFERENCE SIGNS LIST 1, 1A strain gauge, 5, 5A sensor module, 10, 10X substrate, 10a upper surface, 20 functional layer, 31, 32, 33, 34 resistor, 41, 42, 43, 44 interconnect pattern, 51, 52, 53, 54 terminal section, 61, 62, 63, 64 cover layer, 110 flexure element, 120 adhesive layer

The invention claimed is:

1. A strain gauge comprising:
a flexible substrate; and
a plurality of resistors each formed of a film containing Cr, CrN, and $Cr_2N$, on or above the substrate, the resistance of each resistor changing in accordance with a strain; and
pairs of terminals, each pair of terminals being electrically coupled to a corresponding resistor among the plurality of resistors, such that the change in the resistance of the corresponding resistor is output via the pair of terminals,
wherein the substrate is attached to a flexure element, the plurality of resistors including two resistors disposed at locations at which the two resistors are opposite to each other, such that the flexure element is interposed between the two resistors,
wherein the flexure element is cuboidal,
wherein the pairs of terminals are respectively provided on surfaces of the cuboidal flexure element, the pair of terminals and the resistors provided on different surfaces of the cuboidal flexure element.

2. The strain gauge according to claim 1, wherein the substrate includes a first region where a first surface of the flexure element is attachable and includes a second region and a third region where a second surface and a third surface of the flexure element that are each adjacent to the first surface of the flexure element and that are opposite to each other are attachable, and
wherein one among the two resistors is disposed with respect to the second region, and another among the two resistors is disposed with respect to the third region.

3. A strain gauge comprising:
a flexible substrate; and
a plurality of resistors each formed of a Cr composite film, on or above the substrate,
wherein the substrate is attached to a flexure element, the plurality of resistors including: two resistors disposed at locations at which the two resistors are opposite to each other, such that the flexure element is interposed between the two resistors; and two other resistors disposed at locations at which the two other resistors are opposite to each other, such that the flexure element is interposed between the two other resistors, wherein the substrate includes a first region where a first surface of the flexure element is attachable; a second region and a third region where a second surface and a third surface of the flexure element that are each adjacent to the first surface of the flexure element and that are opposite to each other are attachable; and a fourth region and a fifth region where a fourth surface and a fifth surface of the flexure element that are each adjacent to the first surface of the flexure element and that are opposite to each other are attachable, wherein one among the two resistors is disposed with respect to the second region, and another among the two resistors is disposed with respect to the third region, and wherein one among the two other resistors is disposed with respect to the fourth region, and another among the two other resistors is disposed with respect to the fifth region.

4. The strain gauge according to claim 2, further comprising electrodes electrically connected to each of the resistors, wherein the electrodes are disposed with respect to the first region.

5. The strain gauge according to claim 1, wherein the resistors opposite to each other are disposed on or above the substrate, such that grid directions of the resistors are toward a same direction.

6. The strain gauge according to claim 1, wherein the substrate is formed of a resin.

7. The strain gauge according to claim 6, further comprising a functional layer formed of a metal, an alloy, or a metal compound, directly on one surface of the substrate, wherein the resistors are formed on one surface of the functional layer.

8. The strain gauge according to claim 7, wherein the functional layer promotes crystal growth of the resistors; protects the resistors from oxidation; suppresses movement of oxygen and moisture present in the substrate into the resistors; and/or improves adhesion between the substrate and each resistor.

9. The strain gauge according to claim 7, wherein an element contained in the functional layer is diffused into the resistors.

10. The strain gauge according to claim 9, wherein each resistor includes a nitride of the element.

11. The strain gauge according to claim 7, wherein the functional layer is patterned in a same planar shape as the resistors.

12. The strain gauge according to claim 7, wherein a thickness of the functional layer is between 1 nm and 100 nm.

13. A sensor module comprising:
the strain gauge according to claim 1; and
the flexure element to which the substrate is attached,
wherein at least the two resistors are disposed at locations at which the two resistors are opposite to each other, such that the flexure element is interposed between the two resistors.

* * * * *